(12) United States Patent
Bickham et al.

(10) Patent No.: US 7,103,251 B2
(45) Date of Patent: Sep. 5, 2006

(54) DISPERSION FLATTENED NZDSF FIBER (75) Inventors: Scott R. Bickham, Corning, NY (US); Phong Diep, Horseheads, NY (US); Denis Donlagic, Maribor (SI); Pushkar Tandon, Corning, NY (US); Peihong Zhang, Berkeley, CA (US)

(73) Assignee: Corning Incorporated, Corning, NY (US)

( * ) Notice: Subject to any disclaimer, the term of this patent is extended or adjusted under 35 U.S.C. 154(b) by 164 days.

(21) Appl. No.: 10/731,601

(22) Filed: Dec. 9, 2003

(65) Prior Publication Data

US 2004/0126074 A1 Jul. 1, 2004

Related U.S. Application Data

(60) Provisional application No. 60/437,291, filed on Dec. 31, 2002.

(51) Int. Cl.
G02B 6/02 (2006.01)

(52) U.S. Cl. .................................... 385/127; 385/128

(58) Field of Classification Search ................ 385/127
See application file for complete search history.

(56) References Cited

U.S. PATENT DOCUMENTS

| | | | |
|---|---|---|---|
| 5,684,909 A | 11/1997 | Liu ................. | 385/127 |
| 5,878,182 A | 3/1999 | Peckham .......... | 385/123 |
| 5,905,838 A | 5/1999 | Judy et al. ........ | 385/123 |
| 6,266,467 B1 | 7/2001 | Kato et al. ........ | 385/123 |
| 6,301,422 B1 | 10/2001 | Li .................... | 385/127 |
| 6,317,552 B1 | 11/2001 | Berkey ............. | 385/127 |
| 6,493,495 B1 | 12/2002 | Liu et al. .......... | 385/126 |
| 6,529,666 B1 | 3/2003 | Dultz et al. ....... | 385/127 |
| 6,535,675 B1 | 3/2003 | Rousseau et al. .. | 385/123 |
| 6,556,758 B1 | 4/2003 | Kato ................ | 385/127 |
| 6,567,596 B1 | 5/2003 | Kato et al. ........ | 385/123 |
| 6,614,973 B1 | 9/2003 | de Montmorillon et al. ........... | 385/123 |
| 6,633,714 B1 | 10/2003 | de Montmorillon et al. ........... | 385/124 |
| 6,640,036 B1 | 10/2003 | Mukasa et al. ... | 385/124 |
| 6,684,018 B1 | 1/2004 | Arai et al. ........ | 385/127 |
| 6,724,966 B1 | 4/2004 | Mukasa ............ | 385/127 |
| 2002/0006259 A1 | 1/2002 | Tirloni ............. | 385/127 |
| 2002/0168159 A1 | 11/2002 | Takahashi et al. | 385/123 |
| 2003/0021561 A1* | 1/2003 | Berkey et al. .... | 385/123 |
| 2003/0021562 A1 | 1/2003 | Kumano ........... | 385/123 |
| 2003/0053780 A1 | 3/2003 | Zhang .............. | 385/127 |
| 2003/0081921 A1 | 5/2003 | Sillard et al. ..... | 385/124 |
| 2003/0095767 A1* | 5/2003 | Hiroishi et al. ... | 385/126 |
| 2003/0118304 A1 | 6/2003 | Shibuta ............ | 385/124 |
| 2003/0152347 A1 | 8/2003 | Matsuo et al. .... | 385/123 |
| 2003/0169988 A1 | 9/2003 | Matsuo et al. .... | 385/127 |

(Continued)

OTHER PUBLICATIONS

Akasaka, et al., "*Enlargement of effective core area on dispersion-flattened fiber and its low nonlinearity*", OFC'98 Technical Digest, Feb. 22-27, 1998, San Jose, California, pp. 302-303.

(Continued)

*Primary Examiner*—Frank G. Font
*Assistant Examiner*—Timothy Rude
(74) *Attorney, Agent, or Firm*—Joseph M. Homa (57) ABSTRACT

A dispersion flattened non-zero dispersion shifted optical waveguide fiber which includes a central core region surrounded by an outer cladding region, the central core region having an alpha less than 4. The optical fiber has a dispersion at a wavelength of about 1550 nm of between about 4 ps/nm/km and about 8 ps/nm/km, and a dispersion slope of less than 0.025 ps/nm$^2$/km at every wavelength between about 1525 nm and 1650 nm.

27 Claims, 6 Drawing Sheets

U.S. PATENT DOCUMENTS

2004/0028359 A1 2/2004 Tirloni et al. ............... 385/123
2004/0126074 A1* 7/2004 Bickham et al. ............ 385/127

OTHER PUBLICATIONS

Peckham, et al., "*Reduced Dispersion Slope, Non-Zero Dispersion Fiber*", ECOC '98, Sep. 20-24, 1998, Madrid, Spain, pp. 139-140.

Yokoyama, et al., "*Practically Feasible Dispersion Flattened Fibers Produced by VAD Technique*", ECOC '98, Sep. 20-24, 1998, Madrid, Spain, pp. 131-132.

Kumano, et al., "*Novel NZ-DSF with Ultra-low Dispersion Slope Lower than 0.020 ps/nm2/km*",ECOC '01 vol. 6, Sep. 30-Oct. 4, 2001, pp. 54-55.

Safaai-Jazi, et al., "*Evaluation of chromatic dispersion in W-type fibers*",Optics Letters vol. 14 No. 14, Jul. 15, 1989, pp. 760-762.

Hatayama, et al., "*Dispersion flattened fiber with large-effective-core area more than 50 $\mu m^2$*",OFC'98 Technical Digest, Feb. 22-27, 1998, San Jose, California, pp. 304-305.

Lieber, et al., "*Three-Step Index Strictly Single-Mode, Only F-Doped Silica Fibers for Broad-Band Low Dispersion*", Journal of Lightwave Technology, vol. Lt-4, No. 7, Jul. 1986, pp. 715-719.

Gao, et al., "*Attenuation-Optimized Dispersion-Flattened Quadruple-Clad Fibers with Moderate F-Doping in the First Inner Cladding*", IEEE Photonics Technology Letters, vol. 4, No. 6, Jun. 1992, pp. 638-641.

*TrueWave®RS Nonzero-Dispersion Optical Fiber Optimized for the Third and Ready for the Fourth Wavelength Window!*, Lucent Technologies, Jun. 1998.

* cited by examiner

DISPERSION FLATTENED NZDSF FIBER

CROSS-REFERENCE TO RELATED APPLICATIONS

This application claims the benefit of, and priority to U.S. patent application Ser. No. 60/437,291 filed on Dec. 31, 2002.

BACKGROUND OF THE INVENTION

1. Field of the Invention

The present invention relates to non-zero dispersion shifted optical fibers (NZDSF) having low slope. More preferably, the present invention relates to NZDSF fibers having low slope and low zero dispersion wavelength.

2. Technical Background

Wavelength division multiplexing (WDM) systems have operated around the 1550 nm wavelength region, defined herein as including the C-band, which includes wavelengths between about 1525 nm to about 1565 nm, and the L-band, which includes wavelengths between about 1565 nm to about 1625 nm. Some known fibers have a zero dispersion wavelength located outside the operation window which may help prevent nonlinear penalties such as four-wave mixing (FWM) and cross-phase modulation (XPM). However, the zero dispersion wavelength of known NZDSF fibers is typically within 100 nm of 1550 nm in order to reduce the magnitude of the dispersion of a transmitted signal in the 1550 nm operating window so as to allow longer span lengths and less frequent dispersion compensation.

Preferably, coarse wavelength division multiplexing (CWDM) systems and applications operate in the WDM 1550 nm window, i.e. in the C- and L-bands, in the S-band (between about 1450 nm and about 1525 nm), and in the 1310 nm window (between about 1280 nm and about 1330 nm).

Known fibers have optical characteristics which are suitable for operation in specific windows. For example, standard single mode transmission fibers, such as the SMF-28™ optical fiber manufactured by Corning Incorporated, have a zero dispersion wavelength at or near 1310 nm, and such fibers can perform suitably in the 1310 nm window. The dispersion exhibited by such optical fiber at 1550 nm is around 17 ps/nm/km, which is larger than the dispersion at 1550 nm of typical NZDSF fiber, and which can require frequent dispersion compensation. NZDSF optical fiber can perform suitably in the 1550 nm window. Examples of NZDSF fiber include: LEAF® fiber by Corning Incorporated which has an average zero dispersion wavelength near 1500 nm and a dispersion slope of about 0.08 ps/nm/km at about 1550 nm, Submarine LEAF® fiber by Corning Incorporated which has an average zero dispersion wavelength near 1590 nm and a dispersion slope of about 0.1 ps/nm/km at about 1550 nm, MetroCor™ fiber by Corning Incorporated which has a zero dispersion wavelength near 1650 nm, and Truewave RS™ fiber by Lucent Corporation which has a zero dispersion wavelength of about 1450 nm. However, the magnitude of the dispersion in the 1310 nm window of these NZDSF optical fibers is not low, and many NZDSF fibers have specified cable cutoff wavelengths which are greater than 1260 nm. An optical fiber by Alcatel, Teralight® Metro, addresses dispersion in the 1310 window, but such fiber has a high dispersion for 40 Gb/s transmission in the C-band as well as a relatively high dispersion slope, which tends to limit the reach of the fiber within a system and/or would require frequent compensation at longer wavelengths.

SUMMARY OF THE INVENTION

An optical waveguide fiber is disclosed herein comprising a central core region surrounded by an outer cladding region, the central core region having an alpha ($\alpha$) less than 4, the fiber having a dispersion at a wavelength of about 1550 nm of between about 4 ps/nm/km and about 8 ps/nm/km, and a dispersion slope of less than 0.025 ps/nm$_2$/km at every wavelength between about 1525 nm and 1650 nm.

Preferably, the dispersion slope is less than 0.02 ps/nm$^2$/km at every wavelength between about 1525 nm and 1650 nm.

In a preferred embodiment, the dispersion slope is less than 0.025 ps/nm$^2$/kM at every wavelength between about 1525 nm and 1700 nm.

Preferably, the absolute magnitude of the dispersion is less than 10 ps/nm/km at every wavelength between about 1310 nm and 1700 nm.

In a preferred embodiment, the optical waveguide fiber further preferably comprises a first annular core region surrounding and immediately adjacent the central core region, the first annular core region having a minimum relative refractive index percent, $\Delta_{2,MIN}$ between about −0.3% and −0.4%.

Preferably, the fiber has zero dispersion wavelength less than about 1430 nm, more preferably less than about 1400 nm.

Preferably, the fiber has a cabled cutoff wavelength of less than about 1260 nm.

Preferably, the fiber has an effective area of greater than about 40 µm$^2$ at a wavelength of about 1550 nm.

Preferably, the fiber has a pin array bending loss less than about 8 dB at a wavelength of about 1550 nm, even more preferably the fiber has a pin array bending loss less than about 5 dB at a wavelength of about 1550 nm. The fiber preferably has a pin array bending loss less than about 15 dB at a wavelength of about 1600 nm.

In preferred embodiments, the optical fiber further comprises: a first annular core region immediately adjacent and surrounding the central region and having a negative relative refractive index percent, $\Delta_2\%(r)$, with a minimum relative refractive index percent, $\Delta_{2,MIN}$; a second annular core region immediately adjacent and surrounding the first annular core region and having a positive relative refractive index percent, $\Delta_3\%(r)$ with a maximum relative refractive index percent, $\Delta_{3,MAX}$; and a third annular core region immediately adjacent and surrounding the second annular core region and disposed between the second annular core region and the outer annular cladding region, the third annular core region having a negative relative refractive index percent, $\Delta_4\%(r)$ with a minimum relative refractive index percent, $\Delta_{4,MIN}$ negative relative refractive index percent, $\Delta_4\%(r)$ with a minimum relative refractive index percent, $\Delta_{4,MIN}$; wherein the central core region extends radially outward from the centerline and has a positive relative refractive index percent, $\Delta_1\%(r)$ with a maximum relative refractive index percent, $\Delta_{1,MAX}$; and wherein the outer annular cladding region surrounds and is immediately adjacent the third annular core region and has a relative refractive index percent, $\Delta_c\%(r)$.

In preferred embodiments, the central core region has an alpha less than 3.5.

In preferred embodiments, $\Delta_{1,MAX}$ is between about 0.5% and 0.7%, the central and −0.5%, the first annular core region has a width of between about 1 µm and 5 µm and a midpoint between about 3 µm and 7 µm, the second annular core region has a width of between about 3 µm and 7 µm and a midpoint between about 7 µm and 11 µm, and the third annular core region has a width of between about 2 µm and 6 µm and a midpoint between about 11 µm and 15 µm.

Preferably, $\Delta_{3,MAX}$ is between about 0.1% and 0.3%, and $\Delta_{4,MIN}$ is between about −0.03% and −0.2%.

In a preferred embodiment, an optical transmission system is disclosed herein which comprises the optical waveguide fiber.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings. An exemplary embodiment of a segmented core refractive index profile in accordance with the present invention is shown in each of the figures.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$ where $n_i$ is the maximum refractive index in region i, unless otherwise specified, and $n_c$ is the average refractive index of the cladding region. In cases where the refractive index of an annular region or a segment is less than the average refractive index of the cladding region, the relative index percent is negative and is referred to as having a depressed region or depressed index, and is calculated at the point at which the relative index is most negative unless otherwise specified. In cases where the refractive index of an annular region or a segment is greater than the average refractive index of the cladding region, the relative index percent is positive and the region can be said to be raised or to have a positive index. A "downdopant" is herein considered to be a dopant which has a propensity to lower the refractive index relative to pure undoped $SiO_2$. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero.

"Effective area" is defined as:

$$A_{eff} = 2\pi (\int E^2 r\, dr)^2 / (\int E^4\, r\, dr),$$

where the integration limits are 0 to ∞, and E is the electric field associated with light propagated in the waveguide.

The term "α-profile" or "alpha profile" refers to a refractive index profile, expressed in terms of $\Delta(r)$ %, where r is radius, which follows the equation, $$\Delta(r)\% = \Delta(r_o)(1 - [|r - r_o|/(r_1 - r_o)]^\alpha),$$

where $r_o$ is the point at which $\Delta(r)\%$ is maximum, $r_1$ is the point at which $\Delta(r)\%$ is zero, and r is in the range $r_i \geq r \geq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, 2 w=MFD, and $w^2 = (2 \int E^2 r\, dr / \int [dE/dr]^2 r\, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical fiber isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Generally, the "physical" core of optical fiber comprises one or more segments which may be doped. The segments are physically identifiable portions of the core. At the same time, it should be understood that, optically speaking, the "optical" core is considered herein to be where about 99% of the propagated light travels within the optical fiber, wherein a portion of the propagated light could travel outside a physical core segment.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 1:
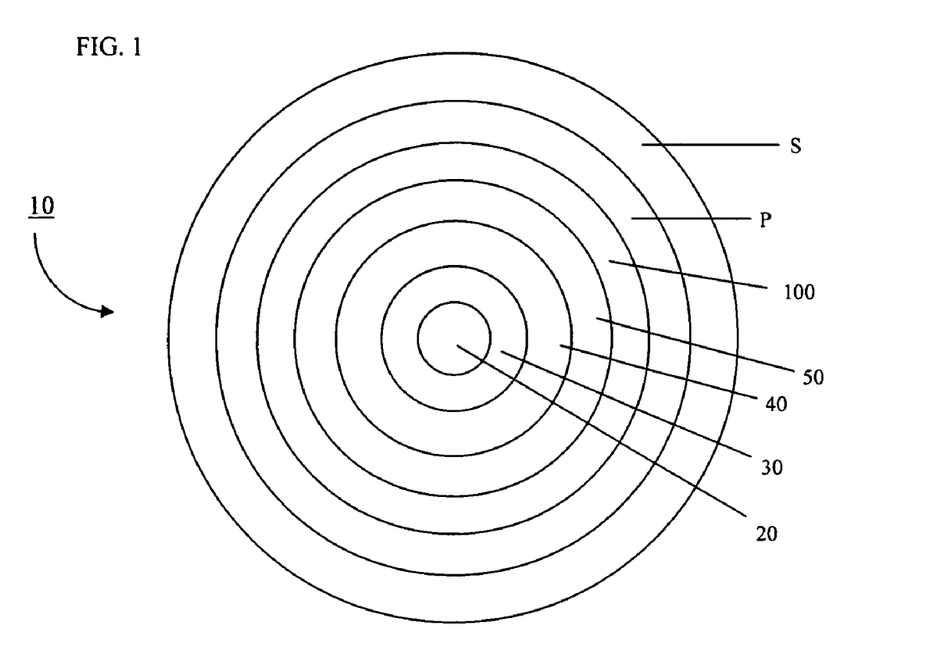
FIG. 1 is a schematic cross-sectional view of a preferred embodiment of an optical waveguide fiber as disclosed herein.

FIG. 1 is a schematic representation (not to scale) of an optical waveguide fiber 10 in accordance with the present invention having a central region (or first core segment) 20, a first annular core region (or second core segment) 30 immediately adjacent and surrounding the central region 20, a second annular core region (or third core segment) 40 immediately adjacent and surrounding the first annular core region 30, a third annular core region (or fourth core segment) 50 immediately adjacent and surrounding the second annular core region 40, and an outer annular cladding region or cladding or clad layer 100 immediately adjacent and surrounding the third annular core region 50. Preferably, the central region contains no downdopant.

Preferably, the cladding 100 of the optical fiber disclosed herein is pure or substantially pure silica. More preferably, the cladding contains no germania or fluorine dopants therein. The outer annular cladding region 100 may be comprised of a cladding material which was deposited, for example during a laydown process, or which was provided in the form of a jacketing, such as a tube in a rod-in-tube optical preform arrangement, or a combination of deposited material and a jacket. The outer annular cladding region 100 may include one or more dopants. The cladding 100 is surrounded by a primary coating P and a secondary coating S. The refractive index of the cladding 100 is used to calculate the relative refractive index percentage as discussed elsewhere herein.

Referring to the Figures, the clad layer 100 has a refractive index of nc surrounding the core which is defined to have a $\Delta\%(r)=0$, which is used to calculate the refractive index percentage of the various portions or regions of an optical fiber or optical fiber preform.

In describing the profile of a region such as the central core region or core region, a half maximum point can be defined by determining a peak refractive index or maximum relative index of a particular segment, such as $\Delta 1,MAX$, and determining what radius corresponds to a relative refractive index which is equal to one-half the value of the peak refractive index or maximum relative index, such as $\Delta 1,MAX$, i.e. where a vertical line depending from the curve describing the relative refractive index versus radius intersects with the axis corresponding to $\Delta\%(r)=0$, i.e. the relative refractive index of the clad layer.

Figure 2:
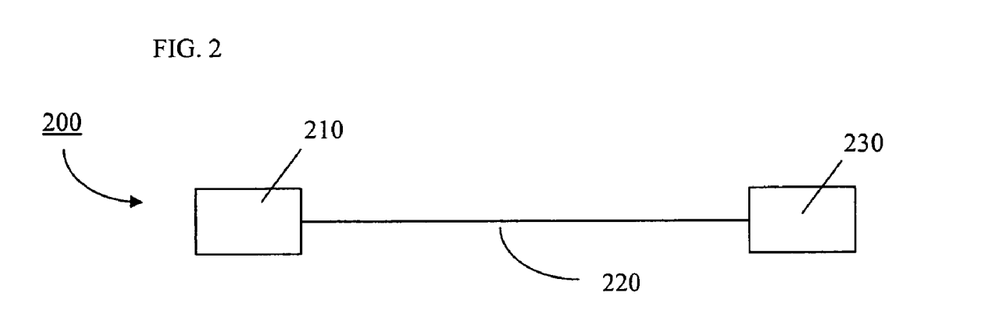
FIG. 2 is a schematic view of a fiber optic communication system employing an optical fiber as disclosed herein.

As shown in FIG. 2, an optical fiber 220 as disclosed herein may be implemented in an optical fiber communication system 200. System 200 includes a transmitter 210 and a receiver 230, wherein optical fiber 220 allows transmission of an optical signal between transmitter 210 and receiver 230. System 200 is preferably capable of 2-way communication, and transmitter 210 and receiver 230 are shown for illustration only. The system 200 preferably includes a link which has a section or a span of optical fiber as disclosed herein. The system 200 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low water content, and preferably are low water peak optical fibers, i.e. having an attenuation curve which exhibits a relatively low, or no, water peak in a particular wavelength region, especially the 1383 nm window.

A soot preform or soot body can be formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process.

A substrate or bait rod or mandrel is inserted through a glass body such as hollow or tubular handle and mounted on a lathe. The lathe is designed to rotate and translate the mandrel in close proximity with a soot-generating burner. As the mandrel is rotated and translated, silica-based reaction product, known generally as soot, is directed toward mandrel. At least a portion of silica-based reaction product is deposited on the mandrel and on a portion of a glass handle to form a soot body thereon.

Once the desired quantity of soot has been deposited on the mandrel, soot deposition is terminated and the mandrel is removed from the soot body.

Upon removal of the mandrel, the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing the soot body to a chlorine-containing atmosphere at elevated temperature within a consolidation furnace. A chlorine-containing atmosphere effectively removes water and other impurities from the soot body, which otherwise would have an undesirable effect on the properties of optical waveguide fiber manufactured from soot body. In an OVD formed soot body, the chlorine flows sufficiently through the soot to effectively dry the entire blank, including the centerline region surrounding the centerline hole.

Following the chemical drying step, the temperature of the furnace is elevated to a temperature sufficient to consolidate the soot blank into a sintered glass preform, preferably about 1500° C. The centerline hole is then closed during the consolidation step so that the centerline hole does not have an opportunity to be rewet by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

A glass body such as a bottom plug is positioned in the centerline hole at the end of the soot body remote from the handle, and a glass body such as hollow tubular glass plug or top plug having a open end is positioned in the centerline hole in the soot body opposite the plug. The top plug can be disposed within a cavity of a tubular handle. Following chlorine drying, the soot body is down driven into the hot zone of the consolidation furnace to seal the centerline hole and consolidate the soot body into a sintered glass preform or consolidated glass preform. Drying and consolidation may optionally occur simultaneously. During consolidation, the soot body contracts somewhat and engages the bottom plug and the lower end of the top plug, thereby fusing the resulting sintered glass preform to the plugs and sealing the centerline hole. Sealing of both the top and bottom of the centerline hole can be accomplished with one pass of the soot body through the hot zone. Preferably, the consolidated glass preform or sintered glass preform is held at an elevated temperature, preferably in a holding oven, to allow inert gas to diffuse from the centerline hole to form a passive vacuum within the sealed centerline hole. Preferably, the top plug has a relatively thin wall through which diffusion of the inert gas can more expediently occur. The top plug preferably has an enlarged portion for supporting the plug within the handle, and a narrow portion extending into the centerline hole of the soot body. The top plug also preferably includes an elongated hollow portion which may preferably occupy a substantial portion of the handle. The hollow portion provides additional volume to the centerline hole thereby providing a better vacuum within the centerline hole following diffusion of the inert gas. The volume provided by the elongated portion of the plug provides added volume to sealed centerline hole.

As described above and elsewhere herein, the bottom plug and top plug are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or so-called redraw) process.

Consequently, overall lower O-H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 nm, and in particular reduced losses can be obtained in the 1383 nm water peak region thereby resulting in more efficient system operation.

The fibers disclosed herein exhibit low PMD values when fabricated with OVD processes. Spinning of the optical fiber may also lower PMD values for the fiber disclosed herein.

Figure 3:
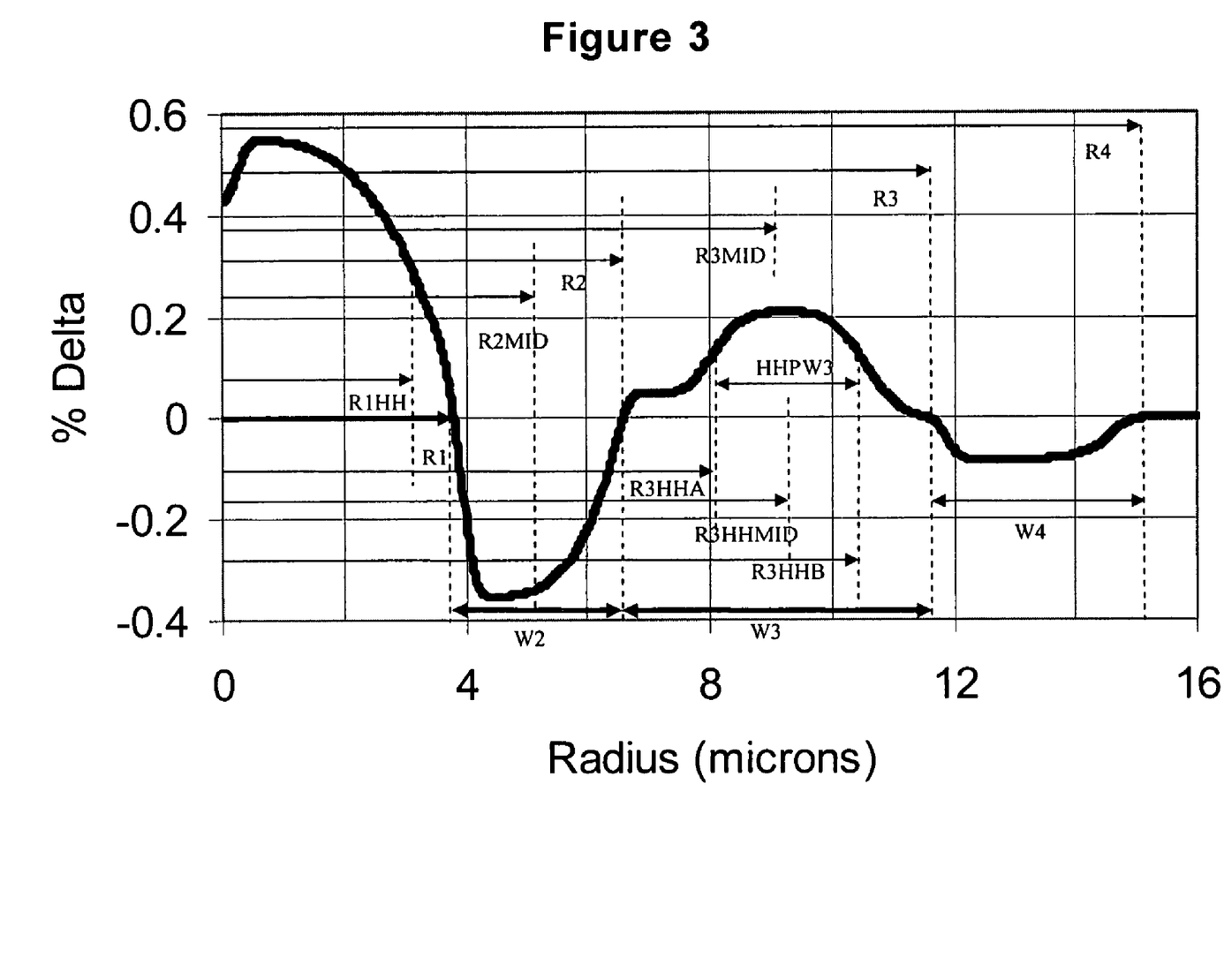
FIG. 3 shows a refractive index profile corresponding to a preferred embodiment of an optical waveguide fiber as disclosed herein.
Figure 4:
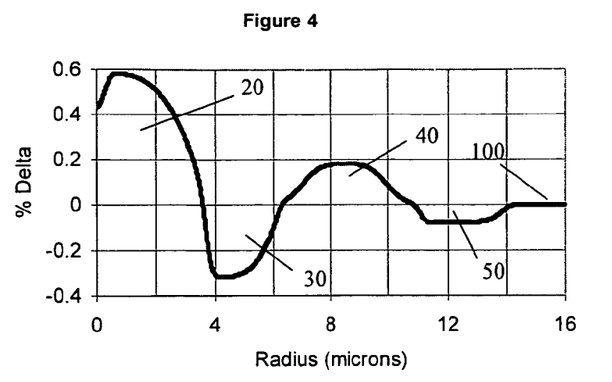
FIG. 4 shows a refractive index profile corresponding to another preferred embodiment of an optical waveguide fiber as disclosed herein.
Figure 5:
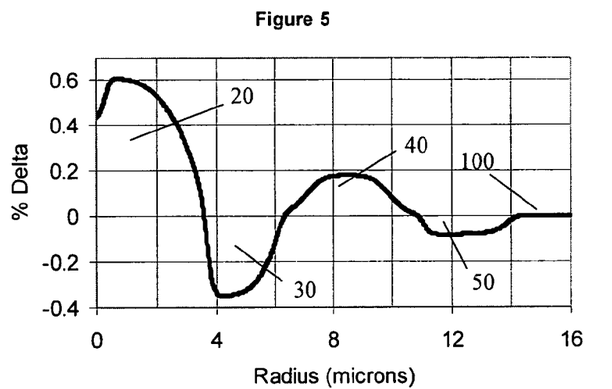
FIG. 5 shows a refractive index profile corresponding to another preferred embodiment of an optical waveguide fiber as disclosed herein.

Referring to FIG. 3, an optical waveguide fiber 10 disclosed herein preferably comprises: a central core region 20 extending radially outwardly from the centerline to a central core region outer radius, $R_1$, and having a positive relative refractive index percent, $\Delta_1\%(r)$ with a maximum relative refractive index percent, $\Delta_{1,MAX}$; a first annular core region 30 surrounding the central region 20 and preferably immediately adjacent thereto, having a width $W_2$ disposed at a midpoint $R_{2mid}$, and having a negative relative refractive index percent, $\Delta_2\%(r)<0$, with a minimum relative refractive index percent, $\Delta_{2,MIN}$; a second annular core region (or ring) 40 surrounding the first annular core region 30 and preferably immediately adjacent thereto, having a ring width $W_3$ disposed at a ring midpoint $R_{3mid}$, and having a positive relative refractive index percent, $\Delta_3\%(r)>0$, with a maximum relative refractive index percent, $\Delta_{3,MAX}$; a fourth annular core region 50 surrounding the third annular core region 40 and preferably immediately adjacent thereto, having a width $W_4$ disposed at a midpoint $R_{4mid}$, and having a negative relative refractive index percent, $\Delta_4\%(r)<0$, with a minimum relative refractive index percent, $\Delta_{4,MIN}$; and an outer annular cladding region 100 surrounding the second annular core region 40 and preferably immediately adjacent thereto and having a relative refractive index percent, $\Delta_c\%$ (r). Preferably, at least the portion of the cladding 100 immediately adjacent the fourth annular core region 50 has $\Delta_c\%=0$. Preferably, $\Delta_{1,MAX} > \Delta_{3,MAX} > 0$. Even more preferably, $\Delta_{1,MAX} > \Delta_{3,MAX} > 0 > \Delta_{4,MIN} > \Delta_{2,MIN}$ The central core region 20 extends from the centerline of the fiber (r=0) to the central core region outer radius, $R_1$. The central core region 20 may have a centerline dip, as depicted, for example, in FIG. 3, which may result from a given method of manufacture, such as by an OVD process, otherwise substantially no centerline dip may appear on the refractive index profile, as depicted, for example, in FIG. 7. $R_{1HH}$ marks the radius of the half-height, or half-peak height, of $\Delta_{1,MAX}$. The end of central core region 20, $R_1$, is preferably the beginning of first annular core region 30 and is defined herein to start at a radius where the refractive index profile intersects with the $\Delta\%=0$ axis.

The first annular core region 30 extends from $R_1$ to the outer radius $R_2$, i.e. at a radius where the refractive index profile again intersects with the $\Delta\%=0$ axis. The width $W_2$ is defined as the radial distance between $R_1$ and $R_2$. (i.e. $W_2=R_2-R_1$). The midpoint $R_{2mid}$ occurs in the middle of $R_1$ and $R_2$ (i.e. $R_{2mid}=(R_1+R_2)/2$).

Preferably, the first annular core region 30 is immediately adjacent the central core region 20.

Figure 6:
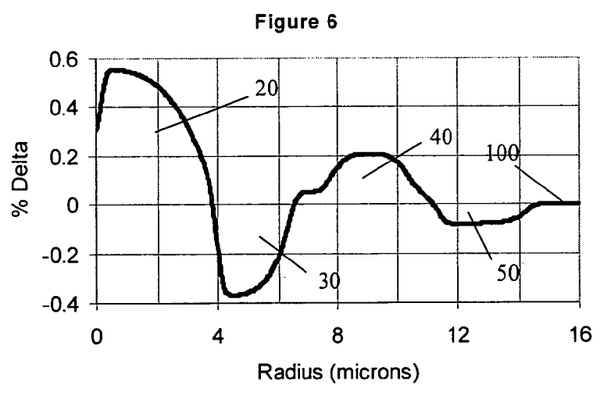
FIG. 6 shows a refractive index profile corresponding to another preferred embodiment of an optical waveguide fiber as disclosed herein.
Figure 7:
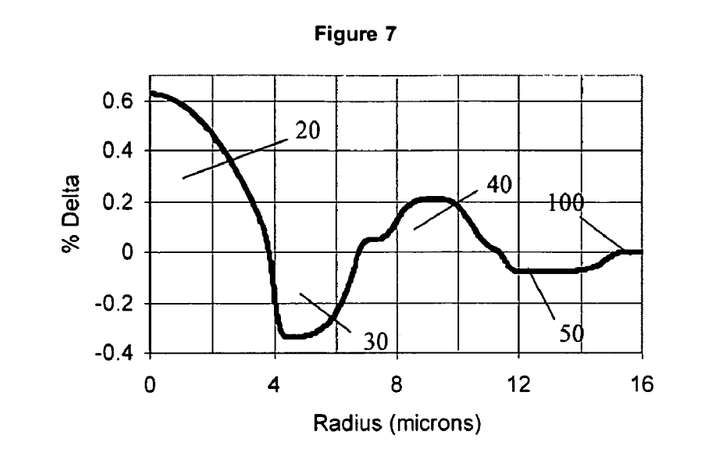
FIG. 7 shows a refractive index profile corresponding to another preferred embodiment of an optical waveguide fiber as disclosed herein.
Figure 8:
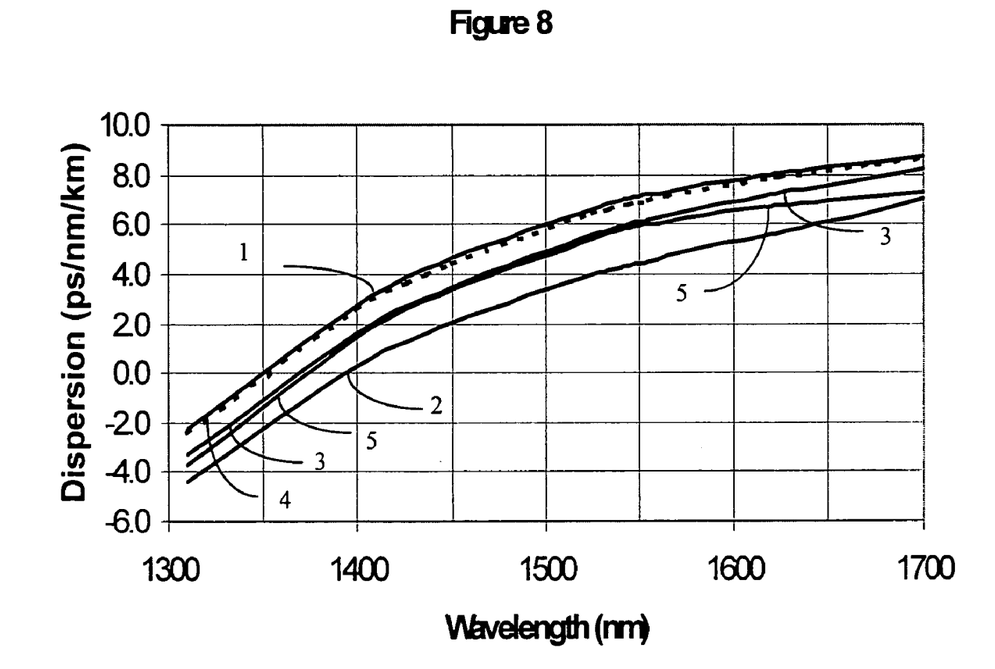
FIG. 8 graphically depicts dispersion at various wavelengths for the optical fibers of FIGS. 3–7.
Figure 9:
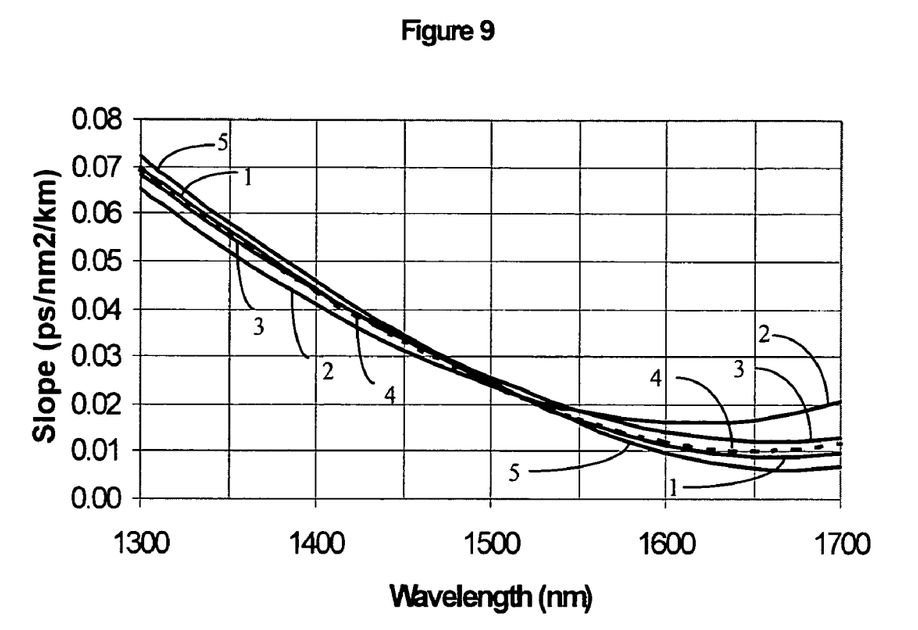
FIG. 9 graphically depicts dispersion slope at various wavelengths for the optical fibers of FIGS. 3–7.
Figure 10:
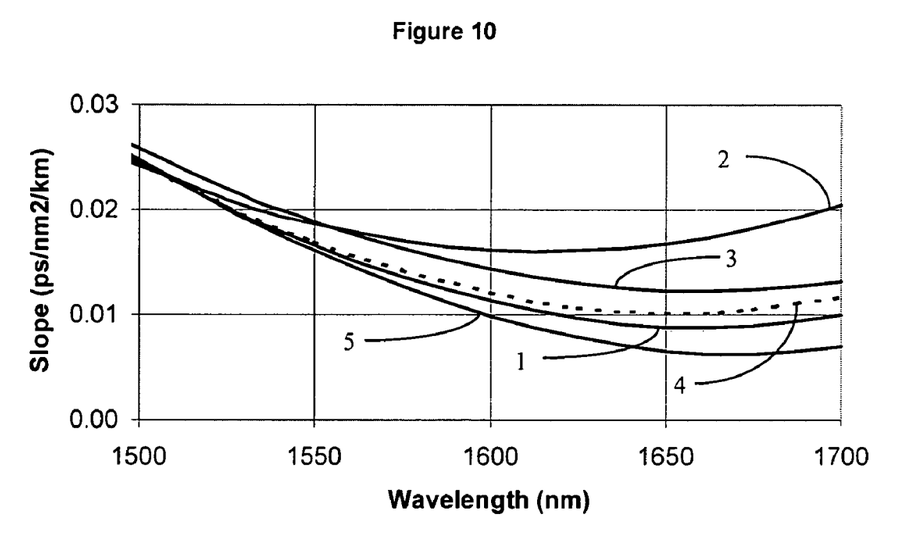
FIG. 10 is a close-up graphical depiction of a portion of the dispersion slopes shown in FIG. 9.
Figure 11:
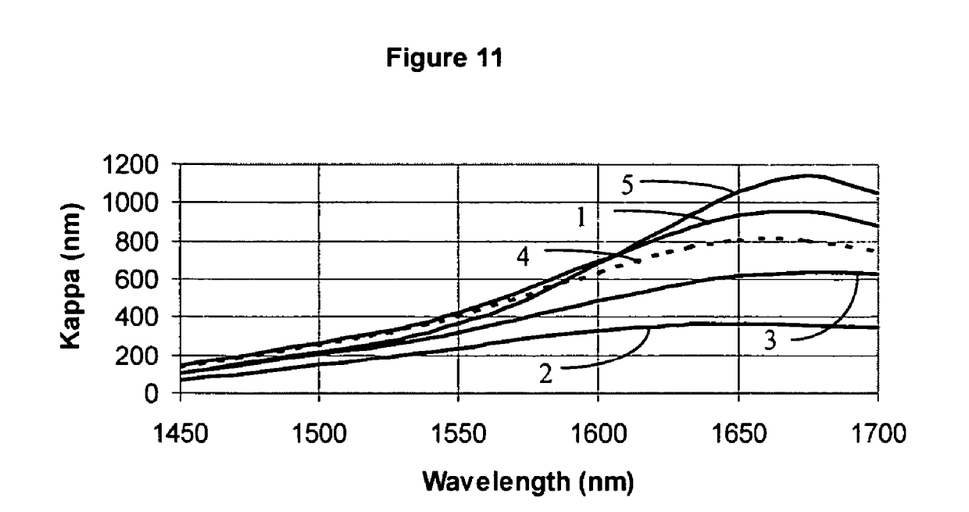
FIG. 11 graphically depicts kappa values at various wavelengths for the optical fibers of FIGS. 3–7.

The second annular core region or ring 40 extends from $R_2$ to the ring outer radius $R_3$, i.e. at a radius where the refractive index profile again intersects with the $\Delta\%=0$ axis. The ring width $W_3$ is defined as the radial distance between $R_2$ and $R_3$. The ring 40 has a positive relative refractive index profile with a "peak" or a maximum relative refractive index percent, $\Delta_{3,MAX}$. $R_{3HHi}$ marks the first radially inward, or centermost, occurrence of the half-height of $\Delta_{3,MAX}$. $R_{3HHj}$ marks the first radially outward occurrence of the half-height of $\Delta_{3,MAX}$. The ring half-height peak width $HHPW_3$ is bounded by inner and outer radii, $R_{3HHi}$ and $R_{3HHj}$, respectively. The midpoint of the ring half-height peak width $HHPW_3$ occurs at a radius $R_{3HHmid}$ which is half the radial distance between $R_{3HHi}$ and $R_{3HHj}$. Preferably, $\Delta_{3,MAX}$ occurs at $R_{3HHmid}$. In some preferred embodiments, the ring 40 is asymmetric in shape about its midpoint. For example, in some preferred embodiments, $R_{3HHmid}$ does not coincide with the middle of the ring 40, $R_{3mid}$. The ring 40 may include a pedestal portion disposed proximate the first annular core region 30, as shown in FIGS. 3, 6, and 7. Preferably, the second annular core region 40 is immediately adjacent the first annular core region 30.

The third annular core region, or gutter, 50 extends from $R_3$ to the outer radius $R_4$, i.e. at a radius where the refractive index profile again intersects with the $\Delta\%=0$ axis. The width $W_4$ is defined as the radial distance between $R_3$ and $R_4$. (i.e. $W_4=R_4-R_3$). Preferably, the third annular core region 50 is immediately adjacent the third annular core region 40.

The profile volume of the optical fiber, or any portion thereof, is defined by:

$$\int_{r_o}^{r_f} \Delta(r) r\, dr$$

wherein $r_o$ and $r_f$ are the radii at the beginning and the end, respectively, of the portion of the fiber for which a profile volume is calculated.

The above-described definitions physical parameters apply to the remaining Figures where appropriate.

The central core region profile volume, or central region volume, is calculated from r=0 to r=$R_1$. The profile volume of the first annular core region, or "moat volume", is calculated from $R_1$ to $R_2$. The ring profile volume, or "ring volume", is calculated from $R_2$ to $R_3$. The gutter profile volume, or "gutter volume", is calculated from $R_3$ to $R_a$. The total profile volume is calculated from r=0 to the outermost diameter of the fiber, wherein, by definition, any portion of the fiber having a relative refractive index $\Delta\%(r)$=0% has a zero contribution to the profile volume. The calculated profile volumes may then be reported in %-$\mu m^2$ for the respective portions and/or the total profile volumes.

Dispersion is given herein in units of ps/nm/km. Dispersion slope, or "slope" is given in ps/nm$^2$/km.

Referring to FIGS. 3–7, five preferred embodiments of the optical fiber 10 disclosed herein are illustrated which comprise: central core region 20; a first annular core region 30 immediately adjacent and surrounding the central core region 20; a second annular core region 40 immediately adjacent and surrounding the first annular core region 30; a third annular core region 50 immediately adjacent and surrounding the second annular core region 40; and an outer annular cladding region 100 immediately adjacent and surrounding the third annular core region 50. Thus, the optical fiber 10 preferably comprises four core segments: center core region 20, first annular core region 30, second annular core region 40, and third annular core region 50. As shown in FIGS. 3–7, the relative refractive index difference with respect to the cladding in percent, or relative refractive index $\Delta\%(r)$, can be plotted versus radius. The relative refractive index $\Delta\%(r)$ of the central core region has an alpha ($\alpha$) profile. Preferably, $\alpha<5$, more preferably $\alpha<4.5$, and even more preferably $\alpha<4$. In preferred embodiments, substantially the entire central core region has an alpha profile. Even more preferably, the entire central core region has an alpha profile.

Central core region 20 comprises a maximum relative refractive index or peak $\Delta_1\%$, $\Delta_{1,MAX}$, preferably greater than about 0.5, more preferably between about 0.5 and 0.7, and a radius $R_1$ of between about 2 and 5 microns, more preferably between about 3 and 5 microns, and even more preferably between about 3 and 4 microns. Preferably, the half-peak height radius is between about 2 and 4 microns, more preferably between about 2.5 and 3.5 microns.

Preferably, the first annular core region 30 comprises a minimum relative refractive index or minimum $\Delta_2\%$, $\Delta_{2,MIN}$, less than (i.e. more negative than) −0.2%, more preferably between about −0.5% and −0.2%, even more preferably between about −0.4% and −0.3%. Preferably, first annular core region 30 ends and second annular core region 40 begins between about 5 microns and about 8 microns, more preferably between about 6 microns and about 7 microns. Preferably, the first annular core region has a width of between about 1 and 5 microns, more preferably between about 2 and 4 microns. Preferably, the first annular core region has a midpoint between about 3 and 7 microns, more preferably between about 4 and 6 microns.

Preferably, second annular core region 40 has a maximum relative refractive index or peak $\Delta_3\%$, $\Delta_{3,MAX}$, of between about 0.08% and 0.3%, more preferably between about 0.1% and 0.3%, and even more preferably between about 0.15% and 0.25%. Preferably, second annular core region 40 ends and third annular core region 50 begins between about 9 microns and about 13 microns, more preferably between about 10 microns and about 12 microns. Preferably, the second annular core region has a width of between about 3 and 7 microns, more preferably between about 4 and 6 microns. Preferably, the second annular core region has a midpoint between about 7 and 11 microns, more preferably between about 8 and 10 microns.

Preferably, third annular core region 50 has a minimum relative refractive index or minimum $\Delta_4\%$, $\Delta_{4,MIN}$, of between about −0.03% and −0.2%, more preferably between about −0.05% and −0.15%. Preferably, third annular core region 50 ends and the cladding region 100 begins between about 12 microns and about 18 microns, more preferably between about 13 microns and about 16 microns. Preferably, the third annular core region has a width of between about 2 and 6 microns, more preferably between about 3 and 5 microns. Preferably, the third annular core region has a midpoint between about 11 and 15 microns, more preferably between about 12 and 14 microns.

Preferably, the outer annular cladding region or cladding segment 100 is disposed immediately adjacent and surrounding third annular core segment 50. $\Delta_{1,MAX}$ is greater than $\Delta_{3,MAX}$. $\Delta_{3,MAX}$ is preferably less than 0.5 $\Delta_{1,MAX}$, more preferably less than 0.4 $\Delta_{1,MAX}$.

EXAMPLES 1 THROUGH 5

Table 1 lists the physical parameters of first through fifth embodiments (Examples 1–5) of the optical fiber 10 disclosed herein. The relative refractive index profiles of Examples 1–5 are represented by the profiles shown in FIGS. 3–7, respectively, with the corresponding entries for the physical parameters of a particular profile being found in Table 1. The central core region of each of the relative refractive index profiles in FIGS. 3–7 has an alpha profile shape.

TABLE 1

Optical Fiber Physical Parameters

| | Ex. 1 | Ex. 2 | Ex. 3 | Ex. 4 | Ex. 5 |
|---|---|---|---|---|---|
| $\Delta_{1,MAX}$ (%) | 0.55 | 0.58 | 0.61 | 0.55 | 0.63 |
| $R_{1HH}$ (μm) | 3.2 | 3.0 | 3.0 | 3.2 | 2.8 |
| $R_1$ (μm) | 3.8 | 3.6 | 3.6 | 3.85 | 3.83 |
| $\alpha_1$ | 3 | 3 | 3 | 3 | 2 |
| $\Delta_{2,MIN}$ (%) | −0.35 | −0.32 | −0.35 | −0.37 | −0.34 |
| $R_2$ (μm) | 6.6 | 6.3 | 6.3 | 6.55 | 6.75 |
| $R_{2MID}$ (μm) | 5.2 | 5.0 | 5.0 | 5.2 | 5.3 |
| $W_2$ (μm) | 2.8 | 2.7 | 2.7 | 2.7 | 2.9 |
| $\Delta_{3,MAX}$ (%) | 0.21 | 0.18 | 0.18 | 0.21 | 0.21 |
| $R_{3HHA}$ (μm) | 8 | 7 | 7 | 7.7 | 7.9 |
| $R_{3HHB}$ (μm) | 10.6 | 10 | 10 | 10.5 | 10.5 |
| HHPW3 (μm) | 2.6 | 3 | 3 | 2.8 | 2.6 |
| $R_{3HHMID}$ (μm) | 9.3 | 8.5 | 8.5 | 9.1 | 9.2 |
| $R_3$ (μm) | 11.6 | 10.9 | 10.9 | 11.2 | 11.35 |
| $R_{3MID}$ (μm) | 9.1 | 8.6 | 8.6 | 8.9 | 9.1 |
| $W_3$ (μm) | 5 | 4.6 | 4.6 | 4.7 | 4.6 |
| $\Delta_{4,MIN}$ (%) | −0.083 | −0.08 | −0.08 | −0.08 | −0.077 |
| $R_{4MID}$ (μm) | 13.3 | 12.6 | 12.6 | 13.0 | 13.3 |
| $W_4$ (μm) | 3.4 | 3.4 | 3.4 | 3.5 | 4.0 |
| $R_4$ (μm) | 15 | 14.3 | 14.3 | 14.7 | 15.3 |

Tables 2–7 list the optical properties of Examples 1–5, namely, dispersion (D), dispersion slope (S), kappa (κ=the ratio of dispersion divided by dispersion slope at a particular wavelength), effective area (Aeff), mode field diameter (MFD), pin array bend loss (PA), lateral load loss (LL), attenuation, theoretical cutoff wavelength LP11, theoretical cutoff wavelength LP02, theoretical cutoff wavelength LP01, cabled cutoff wavelength, and zero dispersion wavelength ($\lambda_0$). The properties are reported for various wavelengths as indicated in the leftmost columns of Tables 2–6 (e.g. D@1310 represents Dispersion at 1310 nm, etc.).

TABLE 2

Dispersion

| | | Ex. 1 | Ex. 2 | Ex. 3 | Ex. 4 | Ex. 5 |
|---|---|---|---|---|---|---|
| D @1310 | ps/nm-km | −2.29 | −4.37 | −3.30 | −2.42 | −3.72 |
| D @1400 | ps/nm-km | 2.69 | 0.23 | 1.58 | 2.52 | 1.42 |
| D @1450 | ps/nm-km | 4.64 | 2.03 | 3.52 | 4.44 | 3.43 |
| D @1525 | ps/nm-km | 6.64 | 3.95 | 5.59 | 6.42 | 5.46 |
| D @1550 | ps/nm-km | 7.10 | 4.45 | 6.10 | 6.88 | 5.91 |
| D @1575 | ps/nm-km | 7.47 | 4.89 | 6.54 | 7.27 | 6.27 |
| D @1605 | ps/nm-km | 7.84 | 5.38 | 6.99 | 7.65 | 6.59 |
| D @1625 | ps/nm-km | 8.04 | 5.70 | 7.26 | 7.87 | 6.76 |
| D @1650 | ps/nm-km | 8.27 | 6.11 | 7.57 | 8.13 | 6.94 |
| D @1675 | ps/nm-km | 8.49 | 6.55 | 7.87 | 8.38 | 7.10 |
| D @1700 | ps/nm-km | 8.72 | 7.03 | 8.19 | 8.66 | 7.26 |

TABLE 3

Dispersion Slope

| | | Ex. 1 | Ex. 2 | Ex. 3 | Ex. 4 | Ex. 5 |
|---|---|---|---|---|---|---|
| S @1310 | ps/nm$^2$-km | 0.067 | 0.063 | 0.066 | 0.067 | 0.069 |
| S @1350 | ps/nm$^2$-km | 0.056 | 0.052 | 0.055 | 0.056 | 0.058 |
| S @1400 | ps/nm$^2$-km | 0.044 | 0.041 | 0.044 | 0.044 | 0.046 |
| S @1450 | ps/nm$^2$-km | 0.034 | 0.031 | 0.034 | 0.033 | 0.035 |
| S @1525 | ps/nm$^2$-km | 0.020 | 0.021 | 0.022 | 0.020 | 0.020 |
| S @1550 | ps/nm$^2$-km | 0.017 | 0.019 | 0.019 | 0.017 | 0.016 |
| S @1575 | ps/nm$^2$-km | 0.014 | 0.017 | 0.016 | 0.014 | 0.013 |
| S @1600 | ps/nm$^2$-km | 0.011 | 0.016 | 0.014 | 0.012 | 0.010 |
| S @1625 | ps/nm$^2$-km | 0.010 | 0.016 | 0.013 | 0.011 | 0.008 |
| S @1650 | ps/nm$^2$-km | 0.009 | 0.017 | 0.012 | 0.010 | 0.007 |
| S @1675 | ps/nm$^2$-km | 0.009 | 0.018 | 0.012 | 0.010 | 0.006 |
| S @1700 | ps/nm$^2$-km | 0.010 | 0.021 | 0.013 | 0.012 | 0.007 |

TABLE 4

Kappa

| | | Ex. 1 | Ex. 2 | Ex. 3 | Ex. 4 | Ex. 5 |
|---|---|---|---|---|---|---|
| κ @1450 | nm | 138 | 65 | 104 | 133 | 99 |
| κ @1525 | nm | 328 | 189 | 255 | 316 | 271 |
| κ @1550 | nm | 426 | 239 | 323 | 407 | 366 |
| κ @1575 | nm | 549 | 287 | 401 | 516 | 494 |
| κ @1625 | nm | 837 | 355 | 560 | 743 | 869 |
| κ @1650 | nm | 941 | 365 | 617 | 807 | 1063 |
| κ @1675 | nm | 956 | 359 | 640 | 806 | 1142 |
| κ @1700 | nm | 878 | 342 | 627 | 746 | 1048 |

TABLE 5

Effective Area and Mode Field Diameter

| | | Ex. 1 | Ex. 2 | Ex. 3 | Ex. 4 | Ex. 5 |
|---|---|---|---|---|---|---|
| Aeff @1310 | μm$^2$ | 35 | 33 | 32 | 35 | 32 |
| Aeff @1450 | μm$^2$ | 40 | 38 | 37 | 40 | 39 |
| Aeff @1550 | μm$^2$ | 45 | 44 | 41 | 46 | 43 |
| Aeff @1600 | μm$^2$ | 49 | 48 | 44 | 49 | 43 |
| Aeff @1650 | μm$^2$ | 53 | 52 | 48 | 53 | 45 |
| MFD @1310 | μm | 6.64 | 6.48 | 6.35 | 6.64 | 6.47 |
| MFD @1450 | μm | 7.17 | 7.04 | 6.86 | 7.18 | 6.93 |
| MFD @1550 | μm | 7.64 | 7.55 | 7.32 | 7.66 | 7.49 |
| MFD @1600 | μm | 7.92 | 7.85 | 7.58 | 7.94 | 7.41 |
| MFD @1650 | μm | 8.24 | 8.19 | 7.88 | 8.26 | 7.6 |

TABLE 6

Pin Array and Lateral Load

| | | Ex. 1 | Ex. 2 | Ex. 3 | Ex. 4 | Ex. 5 |
|---|---|---|---|---|---|---|
| PA @1550 | dB | 7.2 | 6.3 | 3.0 | 7.5 | 8.0 |
| PA @1600 | dB | 14.9 | 13.1 | 6.9 | 15.3 | 16.6 |
| PA @1650 | dB | 28.0 | 25.1 | 14.3 | 28.7 | 31.7 |
| LL @1550 | dB/m | 0.51 | 0.31 | 0.15 | 0.51 | 0.47 |
| LL @1600 | dB/m | 1.05 | 0.66 | 0.34 | 1.04 | 0.97 |
| LL @1650 | dB/m | 2.04 | 1.31 | 0.70 | 2.02 | 1.89 |

TABLE 7

Attenuation, Cutoff, Zero Dispersion

| | | Ex. 1 | Ex. 2 | Ex. 3 | Ex. 4 | Ex. 5 |
|---|---|---|---|---|---|---|
| Attenuation | dB/km | 0.204 | 0.206 | 0.206 | 0.204 | 0.202 |
| LP11 | μm | 1.509 | 1.370 | 1.359 | 1.494 | 1.447 |
| LP02 | μm | 1.644 | 1.509 | 1.514 | 1.631 | 1.595 |
| LP01 | μm | ≧5.000 | ≧5.000 | ≧5.000 | ≧5.000 | 4.653 |
| Cabled Cutoff (est.) | nm | 1344 | 1209 | 1214 | 1331 | 1195 |
| Zero Dispersion | nm | 1339 | 1394 | 1364 | 1343 | 1369 |

Preferably, the dispersion slope is positive at all wavelengths between 1300 nm and 1700 nm.

The dispersion and dispersion slope (for example at wavelengths around 1550 nm and above) of the optical fiber disclosed herein provide kappa's which reduce the demands on the design and/or manufacture requirements of a mating or matching compensation optical fiber (such as a dispersion compensation fiber or dispersion compensating fiber or DCF), wherein optical transmission within an expanded range of wavelengths may be more easily provided. Preferably, kappa at 1550 nm is greater than 200 nm, more preferably greater than 300 nm, and even more preferably greater than 400 nm. In preferred embodiments, kappa is greater than 250 nm for wavelengths greater than 1525 nm, including wavelengths between about 1525 nm and 1700 nm. Preferably, kappa at 1625 nm is greater than 500 nm, more preferably kappa at 1625 nm is greater than 600 nm, and even more preferably kappa at 1625 nm is greater than 700 nm.

Preferably, cutoff wavelength for the LP01 mode, sometimes referred to as the "fundamental mode", is high enough to prevent the appearance of a bend edge. As discussed above, the measured and cabled cutoff wavelengths are lower than the theoretical cutoff wavelength value due to bending and/or mechanical pressure. The theoretical cutoff must therefore be high enough to ensure that any bend edge is above the highest desired wavelength of operation, e.g. to at least 1625 nm in any deployment in the L-band.

Preferably, the LP01 cutoff wavelength of the optical fiber disclosed herein is preferably greater than about 4000 nm, more preferably greater than about 4500 nm, and even more preferably greater than about 5000 nm. Reported values of LP01 cutoff wavelength in Table 7 of 5.000 microns represent any value equal to or greater than 5000 nm.

In a preferred embodiment, the optical fiber disclosed herein allows robust performance from 1280 to 1700 nm while also providing relatively large effective area and acceptable bend performance, wherein the optical fiber has a relatively low non-zero dispersion magnitude in the 1310 window, and which also a relatively low non-zero dispersion and relatively low dispersion slope at higher wavelengths to allow 40 Gb/s transmission in the C-band, whereby the low dispersion slope at higher wavelengths permits increased reach of the fiber within a system, and whereby the requirements for frequent dispersion compensation at longer wavelengths is reduced.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm window, the 1383 nm window, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm window (1280–1330 nm), the 1383 nm window, the S-band (1450–1525 nm), the C-band, and the L-band (1570–1625 or 1630 nm).

In a preferred embodiment, the system is an all-Raman system capable of operating at wavelengths greater than 1625 nm, wherein the optical fiber disclosed herein provides reduced bend losses and desirably low dispersion and dispersion slope characteristics in that spectral region.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising a central core region surrounded by an outer cladding region, the central core region having an alpha less than 4, the fiber having a dispersion at a wavelength of about 1550 nm of between about 4 ps/nm/km and about 8 ps/nm/km, and a dispersion slope of less than 0.025 ps/nm$^2$/km at every wavelength between about 1525 nm and 1650 nm.

2. The optical waveguide fiber of claim 1 wherein the dispersion slope is less than 0.025 ps/nm$^2$/km at every wavelength between about 1525 nm and 1700 nm.

3. The optical waveguide fiber of claim 1 wherein the absolute magnitude of the dispersion is less than 10 ps/nm/km at every wavelength between about 1310 nm and 1700 nm.

4. The optical waveguide fiber of claim 1 further comprising a first annular core region surrounding and immediately adjacent the central core region, the first annular core region having a minimum relative refractive index percent, $\Delta_{2,\text{MIN}}$ between about −0.3% and −0.4%.

5. The optical waveguide fiber of claim 1 wherein the fiber has zero dispersion wavelength less than about 1400 nm.

6. The optical waveguide fiber of claim 1 wherein the fiber has a cabled cutoff wavelength of less than about 1260 nm.

7. The optical waveguide fiber of claim 1 wherein the fiber has an effective area of greater than about 40 μm² at a wavelength of about 1550 nm.

8. The optical waveguide fiber of claim 1 wherein the fiber has a pin array bending loss less than about 8 dB at a wavelength of about 1550 nm.

9. The optical waveguide fiber of claim 1 wherein the fiber has a pin array bending loss less than about 5 dB at a wavelength of about 1550 nm.

10. The optical waveguide fiber of claim 1 wherein the fiber has a pin array bending loss less than about 15 dB at a wavelength of about 1600 nm.

11. The optical waveguide fiber of claim 1 wherein the optical fiber further comprises:
   a first annular core region immediately adjacent and surrounding the central region and having a negative relative refractive index percent, $\Delta_2\%(r)$, with a minimum relative refractive index percent, $\Delta_{2,MIN}$;
   a second annular core region immediately adjacent and surrounding the first annular core region and having a positive relative refractive index percent, $\Delta_3\%(r)$ with a maximum relative refractive index percent, $\Delta_{3,MAX}$; and
   a third annular core region immediately adjacent and surrounding the second annular core region and disposed between the second annular core region and the outer annular cladding region, the third annular core region having a negative relative refractive index .percent, $\Delta_4\%(r)$ with a minimum relative refractive index percent, $\Delta_{4,MIN}$;
   wherein the central core region extends radially outward from the centerline and has a positive relative refractive index percent, $\Delta_1\%(r)$ with a maximum relative refractive index percent, $\Delta_{1,MAX}$; and
   wherein the outer annular cladding region surrounds and is immediately adjacent the third annular core region and has a relative refractive index percent, $\Delta_c\%$.

12. The optical waveguide fiber of claim 11 wherein the central core region has an alpha less than 3.5.

13. The optical waveguide fiber of claim 11 wherein the central core region comprises a maximum relative refractive index percent $\Delta_{1,MAX}$ which is between about 0.5% and 0.7%.

14. The optical waveguide fiber of claim 11 wherein the central region has a radius of between about 3 μm and about 5 μm.

15. The optical waveguide fiber of claim 11 wherein $\Delta_{2,MIN}$ is between about −0.2% and −0.5%.

16. The optical waveguide fiber of claim 11 wherein the first annular core region has a width of between about 1 μm and 5 μm and a midpoint between about 3 μm and 7 μm, wherein the second annular core region has a width of between about 3 μm and 7 μm and a midpoint between about 7 μm and 11 μm, and wherein the third annular core region has a width of between about 2 μm and 6 μm and a midpoint between about 11 μm and 15 μm.

17. The optical waveguide fiber of claim 11 wherein $\Delta_{3,MAX}$ is between about 0.1% and 0.3%.

18. The optical waveguide fiber of claim 11 wherein $\Delta_{4,MIN}$ is between about −0.03% and −0.2%.

19. An optical transmission system comprising the optical waveguide fiber of claim 1.

20. An optical waveguide fiber comprising a central core region surrounded by an outer cladding region, the central core region having an alpha less than 4, the fiber having a dispersion at a wavelength of about 1550 nm of between about 4 ps/nm/km and about 8 ps/nm/km, and a dispersion slope of less than 0.025 ps/nm²/km at every wavelength between about 1525 nm and 1650 nm, wherein the central core region comprises a maximum relative refractive index percent $\Delta_{1,MAX}$ between 0.5% and 0.7%.

21. The optical waveguide fiber of claim 20 wherein the central region has a radius of between about 3 μm and about 5 μm.

22. The optical waveguide fiber of claim 20 wherein the optical fiber further comprises:
   a first annular core region immediately adjacent and surrounding the central region and having a negative relative refractive index percent, $\Delta_2\%(r)$, with a minimum relative refractive index percent, $\Delta_{2,MIN}$.

23. The optical waveguide fiber of claim 22 wherein $\Delta_{2,MIN}$ is between −0.2% and −0.5%.

24. The optical waveguide fiber of claim 23 wherein the first annular core region has a width of between about 1 μm and 5 μm and a midpoint between about 3 μm and 7 μm.

25. The optical waveguide fiber of claim 20 wherein the optical fiber further comprises a second annular core region immediately adjacent and surrounding the first annular core region and having a positive relative refractive index percent, $\Delta3\%(r)$ with a maximum relative refractive index percent, $\Delta_{3,MAX}$, wherein $\Delta_{3,MAX}$ is between about 0.1% and 0.3%.

26. The optical waveguide fiber of claim 25 wherein the optical fiber further comprises a third annular core region immediately adjacent and surrounding the second annular core region and disposed between the second annular core region and the outer annular cladding region, the third annular core region having a negative relative refractive index percent, $\Delta4\%(r)$ with a minimum relative refractive index percent.

27. The optical waveguide fiber of claim 26 wherein $\Delta_{4,MIN}$ is between about −0.03% and −0.2%.

* * * * *